AUDIO COMPRESSION SYSTEM

Filed March 22, 1948

INVENTOR.
Marion R. Winkler
BY Foorman L. Mueller
Atty.

Patented Oct. 30, 1951

2,572,900

UNITED STATES PATENT OFFICE 2,572,900

AUDIO COMPRESSION SYSTEM

Marion R. Winkler, La Grange Park, Ill., assignor to Motorola, Inc., Chicago, Ill., a corporation of Illinois Application March 22, 1948, Serial No. 16,331

19 Claims. (Cl. 332—18)

This invention relates generally to systems for compressing audio or other low frequency signals and more particularly to a system for instantaneously compressing the modulating signal applied to a modulation system to prevent over-modulation by high frequency pulses.

It is standard practice in communication systems to transmit low frequency or audio signals by using such signals to modulate a high frequency carrier wave. Such a carrier wave may then be transmitted either over wire lines or by radio. In radio transmission, in order to prevent interference between various communication systems the frequency band must be limited, that is, each communication system must operate within narrow frequency limits so that interference between the various systems will be prevented. In frequency modulating systems the deviation of the modulated carrier wave depends only upon the amplitude of the modulating signal and is entirely independent of frequency thereof. Therefore, by limiting the amplitude of the modulating signal, over-modulating can be prevented. However, in other types of modulating systems as, for example, phase modulating systems the deviation of the carrier wave also varies with the frequency of the modulating signal. For this reason, simple amplitude limiting which is independent of frequency will not necessarily prevent over-modulation of the carrier wave. Therefore, it is necessary that steep wave fronts in the modulating signal be reduced in slope or eliminated.

There are many other applications in communication work in which it is desired to reduce or eliminate high frequency pulses without destroying the intelligibility of the signal or causing objectionable distortion thereof. An example of this is the interference caused by ignition noise in standard amplitude modulated and frequency modulated systems. Such ignition noise is of very high frequency and it would be desirable to remove it from the audio signal.

It is, therefore, an object of the present invention to provide a compression system to limit the high frequency pulses in an audio signal.

A further object of this invention is to provide a system for compressing the modulating signal in a phase modulation system to prevent over-modulation.

Another object is to provide an audio compression system which is instantaneous in operation.

A still further object of this invention is to provide a system for reducing the slope of steep wave fronts in audio frequency signals which introduces a minimum of distortion so that the intelligibility of the audio signals is not appreciably impaired thereby.

A feature of this invention is the provision of a system for compressing an audio signal in which the signal is first differentiated, then clipped and subsequently integrated.

Another feature of this invention is the provision of a compression system in which signals of amplitude and frequency within predetermined limits are not distorted, and in which signals of amplitude and frequency which exceed said limits are distorted by only a small amount which may be tolerated in communication systems.

Further objects, features and advantages will be apparent from a consideration of the following description taken in connection with the accompanying drawings in which.

In practicing the invention there is provided a system for instantaneously compressing or limiting an audio frequency signal which includes a differentiating network to which the audio frequency signal is applied. The differentiating network provides a signal wave the amplitude of which is a measure of the rate of change of the audio signal applied thereto. The amplitude is, therefore, a measure of the frequency of the audio signal. The signal wave produced by differentiation is then applied to a balanced clipping system which is adapted to clip the positive and negative portions of the wave at the same level. The wave after being clipped is then applied to an integrating circuit which provides a wave in which the amplitude changes at a rate corresponding to the amplitude of the applied wave. It is obvious that when the wave applied to the clipper is below the clipping level, the output of the integrating circuit will correspond exactly with the input signal applied to the differentiating circuit so that under this condition the compression circuit is ineffective. When the input signal has such a steep wave front that the clipper cuts a relatively large amplitude from the differentiated wave, the wave applied to the integrating circuit will approach a square wave and the output thereof will approach a triangular wave. A triangular wave is the limiting condition and as the distortion of such a wave is relatively low, the output of the integrating circuit will in any case be distorted only a small amount and the intelligence of the audio signal will not be substantially impaired.

Figure 1:
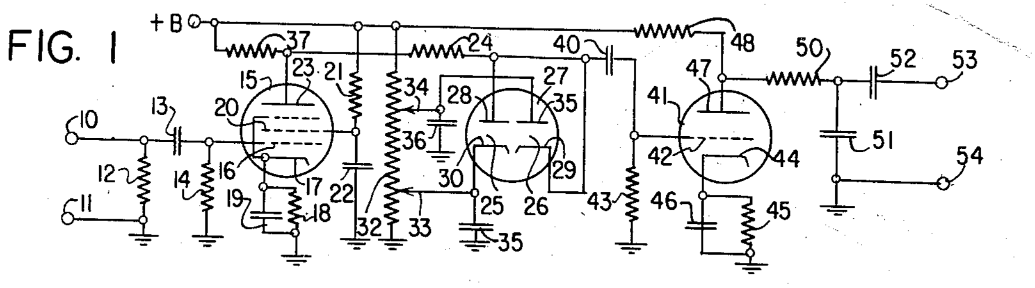
Fig. 1 is a circuit diagram of the audio compression system in accordance with the invention.

Referring now to the drawings, in Fig. 1 a circuit diagram of one embodiment of the compression system is illustrated. The audio signal is applied to terminals 10 and 11 across resistor 12. The resistor 12 should preferably be of low resistance to keep the equivalent source impedance low. The voltage across resistor 12 is applied to the differentiating circuit composed of condenser 13 and resistor 14 connected in series which differentiates all frequencies below a certain value depending upon the constants of the circuit. As is well known, the voltage appearing across resistor 14, for all frequencies under this value, will be proportional to the rate of change of the voltage applied to the differentiating circuit. To increase the amplitude of the differentiated signal wave, a suitable amplifier stage may be provided as, for example, the tube 15 having a grid 16 to which the signal is applied. The amplifier tube 15 includes a cathode 17 biased by resistor 18 which is by-passed by condenser 19. Operating potential is applied to the screen grid 20 through resistor 21 and to the plate 23 through resistor 37, the screen grid being by-passed by condenser 22. It is to be pointed out that any suitable amplifier may be used and the pentode illustrated is only to be considered as an example.

The amplified signal wave appearing on the plate 23 of the tube 15 is applied through a large resistor 24 to a pair of diodes 25 and 26 which may be included in a single tube 27 as illustrated. The wave is applied to the plate 28 of the diode 25 and the cathode 29 of the diode 26, with the cathode 30 of diode 25 and plate 31 of diode 26 being connected to biasing potentials, so that both the positive and negative portions of the differentiated wave are clipped. Potentials for the diodes may be obtained from a resistor 32 connected to a +B potential with movable contacts 33 and 34 being provided on the resistor for connection to the two diodes. These potentials are by-passed by condensers 35 and 36. It is apparent from the above that by proper adjustment of the movable contacts 33 and 34 the potentials applied to the diodes can be controlled so that the clipping of the positive and negative portions of the wave will be at the same level and this level can be adjusted as desired.

The clipped signal is applied through coupling condenser 40 to a second amplifier which is illustrated as a triode 41 by way of example. The signal is applied to grid 42 of the triode which is biased by resistor 43. The cathode 44 is connected to ground through resistor 45 which is by-passed by condenser 46. Operating potential is applied to the plate 47 of the tube through resistor 48. The amplified signal is then applied to an integrating circuit including resistor 50 and condenser 51 connected in series which integrates all frequencies above a certain value depending upon the constants of the circuit. As is well known, the voltage appearing across condenser 51 will vary in accordance with the amplitude and inversely with the frequency of the voltage applied to the integrating circuit to thereby substantially restore the signal originally applied to the differentiating circuit. This signal is applied through coupling condenser 52 to terminals 53 and 54 which may be connected to any circuit in which it is desired to use the compressed audio wave.

Figure 2:
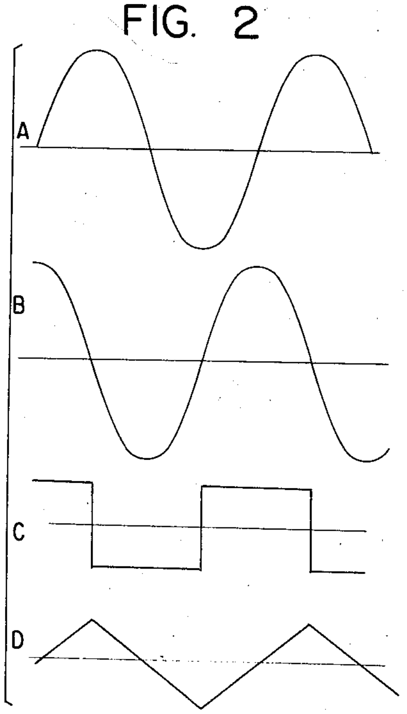
Fig. 2 is a curve chart illustrating the operation of the compression system.

The operation of the circuit of Fig. 1 will be clearly understood from a consideration of the curves in Fig. 2. Curve A indicates a sine wave which may be applied to the terminals 10 and 11. This will appear across the resistor 12 and be differentiated to provide a signal wave across resistor 14 as illustrated in curve B. It is well known that the differentiation of a sine wave produces a cosine wave. This wave is then amplified in the amplifier 15 and applied to the diodes of the clipper. The diodes are biased so that signals under predetermined limits are not affected thereby but that signals above the limits are clipped or limited to the predetermined limits. When operating on simple symmetrical waves, the diodes should be biased so that the clipping action is completely symmetrical or balanced, that is, the maximum amplitude of the negative and the positive portions of the wave should preferably be substantially the same. This results in a minimum of distortion. When the amplitude of the differentiated wave is within the limits allowed and the clipper is not effective, the wave as shown in curve B will be applied to the amplifier 41 and applied to the integrating circuit with the result that the sine wave as shown in curve A will be produced across condenser 51. It is obvious that under these circumstances the wave across the condenser 51 will correspond exactly to the wave applied to the differentiating circuit and no distortion will be introduced by the compression system. When, however, waves of large amplitude are applied to the clippers and a substantial portion of the amplitude is removed therefrom, the output from the clippers will approach a square wave as illustrated by curve C. This represents the condition when maximum compression or limiting is required. When the balanced square wave is applied to the integrating circuit the output therefrom will be a triangular wave having equal sides as illustrated in curve D. A triangular wave is the limiting condition when working with symmetrical waves and using balanced clippers. The triangular wave as illustrated in curve D includes, in addition to the fundamental (as illustrated in curve A, only odd harmonics, that is, the third, fifth, seventh, etc., harmonics. The magnitude of these harmonic waves is inversely proportional to the square of the order of the harmonic. That is, the third harmonic is 1/9 of the fundamental and the fifth harmonic is 1/25, etc. As the amplitude decreases rapidly with the order of the hormonic the total distortion will not be appreciably greater than the distortion produced by the third harmonic. Therefore, the maximum distortion will be of the order of 12 per cent. This is a tolerable distortion for many communications applications.

As previously stated, the differentiating circuit is effective for all frequencies under a predetermined value and the integrating circuit is effective for all frequencies above a predetermined value. The particular values used in the system will depend upon the application in which the compression system is used and will define the limits of the frequencies transmitted by the system without substantial attenuation. When used for voice frequencies, the upper limit may be set at 3000 cycles and the lower limit at 50 cycles.

Figure 3:
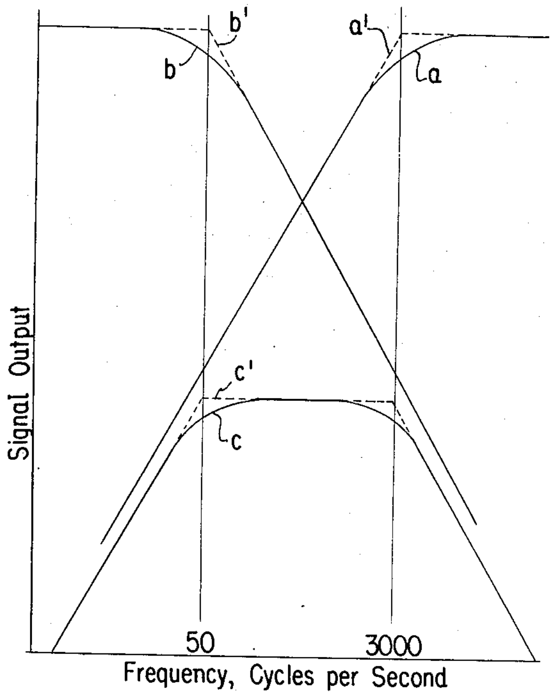
Fig. 3 is a curve chart illustrating the response of the system.

Curves illustrating such a system are illustrated in Fig. 3 in which curve *a* indicates the response of the differentiating circuit when the value of the condenser 13 is .00053 microfarad and the value of resistance 14 is 100,000 ohms. The dotted curve marked *a'* illustrates a sharp cut-off which would theoretically be provided at 3000 cycles, the actual response being indicated by the solid curve and being slightly rounded. To provide integration at frequencies above 50 cycles the resistor 50 may be 100,000 ohms and the condenser 21 may be .032 microfarad. The curve *b* illustrates the actual response in such a circuit and the curve *b'* illustrates the theoretical response with a sharp cut-off at 50 cycles. The response of the entire system is illustrated by curve *c* and it is apparent that the response is substantially level between 50 and 3000 cycles. The cut-off points are considerably rounded instead of being sharply defined as on the theoretical curve *c'*. It is apparent from the curves in Fig. 3 that the effect of the differentiating circuit and that of the integrating circuit in the frequency range from 50 to 3000 cycles is substantially complementary and resulting in an over-all response over this frequency range which is not substantially modified.

Circuits in accordance with the invention have been tested both by observing the waves at various points in the system by oscilloscopes and also by application of voice signals produced by spoken words and then listening to the reproduced sound to determine the intelligibility after passing through the compressor. The wave shapes observed were substantially identical to the waves shown in Fig. 2. When applying signals of such amplitude that large portions are removed from the differentiated waves by the diodes, the intelligibility was not greatly affected and spoken words were easily understood. Observations also indicated that the signals were effectively compressed and the deviation produced thereby was limited. This would confirm the theoretical analysis which indicates that the distortion produced by the system is tolerable and the device is useful.

Figure 4:
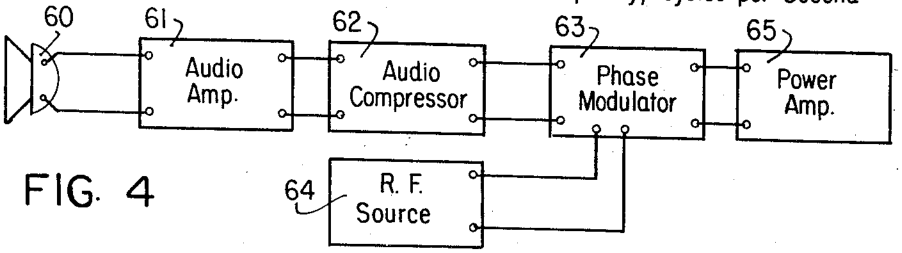
Fig. 4 is a block diagram illustrating the use of the audio compression system in a phase modulation system.

The audio compression system in accordance with the invention is particularly suitable for use to prevent over-modulation in a phase modulating system. Such a system is illustrated in Fig. 4, in which the modulating signal may be derived by any sound source such as microphone 60 and is then amplified by audio amplifier 61. The audio signal is then passed through the compressor 62 prior to being applied to the phase modulator 63. As the amplitude of the differentiated wave produced in the compressor is generally proportional to the deviation produced by the phase modulator, by properly limiting the amplitude of the differentiated wave in the clipper, the deviation of the modulator can be correspondingly limited. Therefore, the modulation of the carrier wave produced by the radio frequency source 64 is limited and the phase modulated wave produced by the modulator 63 will not be over-modulated. As previously stated, it has been proven by tests that the system disclosed is effective to instantaneously limit the deviation. The wave from the modulator may be amplified in the power amplifier 65 and radiated as radio energy or alternatively may be applied to a communication system utilizing wire lines.

It will be apparent from the above that the audio compression system described is instantaneous in operation with the high frequency pulses being positively removed from the signal. This is to be contrasted with known limiter systems in which a certain time delay is involved and high frequency pulses of short duration will not be stopped. Such time delay in the compression system would permit over-modulation when used in a system as illustrated in Fig. 4. The system does not employ variable gain tubes or other components which are critical of adjustment. It is also apparent from the above that the compression system produces a satisfactorily small amount of distortion, there being no distortion at all when the signal is of such amplitude and frequency that the clipper is not effective. When used in a modulating system, the clipping level may be adjusted so that there would be no clipping action when the signal is such that over-modulation would not be produced. The maximum distortion, which will occur when signals of very high frequency are applied to the system resulting in maximum distortion, is found to be of the order of 12 per cent and does not substantially affect the intelligibility of audio frequency signals. Although the above relates to operation with symmetrical signals and the use of balanced clipping, it is to be pointed out that the system may also be used with more complex, non-symmetrical waves with the clipping being unbalanced.

While there has been described one embodiment of the invention which is illustrative thereof, it is apparent that various changes and modifications can be made therein without departing from the intended scope of the invention as defined in the appended claims.

I claim:

1. In a phase modulating system in which the deviation of the carrier wave depends upon both the frequency and the amplitude of the modulating signal, the method of preventing over-modulation of said carrier wave which comprises the steps of, differentiating said modulating signal, limiting the amplitude of said differentiated wave with respect to the axis thereof, and integrating said amplitude limited wave.

2. In a modulating system in which the deviation of the carrier wave depends upon the frequency of the modulating signal, the method of modifying the modulating signal to prevent over-modulation of said carrier wave which comprises the steps of differentiating said modulating signal, symmetrically clipping both the positive and negative portions of said differentiated wave, and integrating said clipped wave.

3. In a modulating system in which a carrier wave is modulated by a signal including components of various frequencies and in which the deviation of the carrier wave depends upon the amplitude and frequency of the modulating signal, the method of modifying the modulating signal to prevent over-modulation of said carrier wave which comprises the steps of differentiating said modulating signal for all frequencies below a predetermined value, limiting the amplitude of said differentiated wave at substantially the same value on either side of the axis thereof, and integrating said clipped wave for all frequencies above a second predetermined value.

4. The method of compressing an audio signal which comprises the steps of differentiating said audio signal, limiting the amplitude of both the positive and negative peaks of said differentiated wave to a fixed level, and integrating said limited wave to produce an output wave having an instantaneous slope directly proportional to the instantaneous amplitude of said limited wave, whereby the resulting wave corresponds exactly to said audio signal when the frequency thereof is such that said differentiated wave remains below said fixed level, and the distortion of said resulting wave is relatively low when said differentiated wave exceeds said fixed level and said differentiated wave is limited.

5. The method of compressing an audio signal which comprises the steps of differentiating said audio signal for all frequencies below a predetermined value, clipping said differentiated wave to limit the amplitude thereof to substantially the same value on either side of the axis of said differentiated wave, and integrating said clipped wave for all frequencies above a second predetermined value to produce an output wave having an instantaneous slope directly proportional to the instantaneous amplitude of said clipped wave for all frequencies above said predetermined value.

6. The method of compressing an audio signal which comprises the steps of differentiating said audio signal, limiting the amplitude of said differentiated wave symmetrically with respect to the axis thereof, and integrating said limited wave to produce an output wave having an instantaneous slope directly proportional to the instantaneous amplitude of said limited wave.

7. Apparatus for compressing an audio frequency wave comprising means for converting said audio signal into a second signal wave having an amplitude varying in accordance with the rate of change of said audio wave, means for limiting the amplitude of said second signal wave to a predetermined level with respect to the axis thereof, and means for producing a wave instantaneously changing in amplitude at a rate corresponding to the instantaneous amplitude of said limited signal wave.

8. Apparatus for compressing an audio frequency wave comprising means for converting said audio signal wave into a second signal wave the amplitude of which varies in accordance with the rate of change of said audio wave, means for symmetrically clipping the positive and negative peaks of said second wave at a predetermined level to limit said second wave to said level, and means for producing a wave the instantaneous rate of change in amplitude of which varies in accordance with the instantaneous amplitude of said second wave, whereby the resulting wave is identical to said audio signal wave when said second wave remains below said predetermined level, and said resulting wave is distorted a limited amount when said second wave exceeds said predetermined level and clipping action takes place.

9. A unitary system for compressing an audio frequency wave comprising a circuit for differentiating said audio signal for all frequencies below a predetermined value, a pair of clippers biased to symmetrically clip said differentiated wave when the amplitude thereof exceeds a predetermined level, and a circuit for integrating said clipped wave for all frequencies above a second predetermined value to produce an output wave having an instantaneous slope directly proportional to the instantaneous amplitude of said clipped wave for all frequencies above said predetermined value.

10. In a phase modulating system in which the deviation of the carrier wave depends upon the frequency of the modulating signal, a unitary system for compressing said modulating signal to prevent over-modulation of said carrier wave comprising, differentiating means for producing a second signal wave the amplitude of which is a measure of the frequency of said modulating signal, means for clipping said second wave when the amplitude thereof reaches a predetermined value to limit said amplitude, and integrating means for providing a third wave the instantaneous rate of change in amplitude of which corresponds to the amplitude of said clipped second wave.

11. In a modulating system in which the deviation of the carrier wave depends upon the frequency of the modulating signal wave, means for preventing over-modulation of said carrier wave comprising a circuit for differentiating said signal wave for all frequencies under a predetermined value, a pair of diodes biased to clip the positive and negative portions of said differentiated wave at a predetermined level, and a circuit for integrating said clipped wave for all frequencies above a second predetermined value.

12. In a modulating system in which the deviation of the carrier wave depends upon the frequency of the modulating signal wave, means for preventing over-modulation of said carrier wave comprising a circuit for differentiating said signal wave for all frequencies below a first predetermined value, means for symmetrically clipping the peaks of said second wave at a predetermined level to limit the amplitude thereof, a circuit for integrating said clipped wave for all frequencies above a second predetermined value whereby said integrated wave is substantially identical to said modulating wave for frequencies between said first and second predetermined values, and frequencies outside said predetermined values are substantially attenuated.

13. In a modulating system in which the deviation of the carrier wave depends upon the amplitude and frequency of the modulating signal wave, means for preventing over-modulation of said carrier wave without substantially distorting signals between the frequency range of 50 and 3000 cycles per second comprising a circuit for differentiating said signal wave for all frequencies below 3000 cycles per second, means for symmetrically clipping the peaks of said differentiated wave at a predetermined level to limit the amplitude thereof, a circuit for integrating said clipped wave for all frequencies above 50 cycles per second whereby said integrated wave is substantially identical to said signal wave for frequencies between 50 and 3000 cycles and frequencies outside this range are substantially attenuated.

14. In a modulating system in which a carrier wave is modulated by a source of low frequency signals including components of various frequencies, and in which the deviation of the carrier wave depends upon the amplitude and frequency of the modulating signal wave, a unitary system for preventing over-modulation of said carrier wave including a circuit for differentiating said modulating signal wave, a pair of diodes biased to clip the positive and negative portions of said differentiated wave at a predetermined level, and a circuit for integrating said clipped wave.

15. In a modulating system in which the deviation of the carrier wave depends upon the frequency of the modulating signal, the method of modifying the modulating signal to prevent over-modulation of the carrier wave which comprises the steps of, producing a wave from said modulating signal having an amplitude which varies in accordance with the rate of change of the voltage of said modulating signal, limiting the amplitude of said produced wave, and producing a signal the voltage of which changes at a rate corresponding to the amplitude of said limited wave.

16. In a modulating system in which the deviation of the carrier wave depends upon the frequency of the modulating signal, the method of modifying the modulating signal to prevent over-modulation of said carrier wave which includes the steps of, converting said modulating signal to a wave having an amplitude which varies in accordance with the rate of change of the voltage of said modulating signal including differentiating said modulating signal at least once, symmetrically clipping the produced wave with respect to the axis thereof, and converting the clipped wave to a wave the voltage of which changes at a rate corresponding to the amplitude of said limited wave including integrating said clipped wave at least once.

17. In a modulating system in which the deviation of the carrier wave depends upon the frequency of the modulating signal wave, apparatus for preventing over-modulation of the carrier wave including in combination, means for converting said modulating signal wave into a second wave having an amplitude varying in accordance with the rate of change of the voltage of said modulating signal wave, means for limiting the amplitude of said second wave to a predetermined level, and means for producing a wave changing in voltage at a rate corresponding to the amplitude of said limited wave.

18. In a phase modulating system in which the deviation of the carrier wave depends upon the amplitude and frequency of the modulating signal wave, apparatus for preventing over-modulation of the carrier wave including in combination, means for converting said modulating signal wave into a second wave having an amplitude varying in accordance with the rate of change of the voltage of said modulating signal wave, means including a pair of diodes for symmetrically limiting the amplitude of said second wave to a predetermined level with respect to the axis thereof, and means for producing a wave changing in voltage at a rate corresponding to the amplitude of said limited signal wave.

19. In a modulating system in which the deviation of the carrier wave depends upon the frequency of the modulating signal wave, means for preventing over-modulation of the carrier wave including in combination, input circuit means for producing a second signal wave from said modulating signal wave including at least one stage of differentiation, rectifier means for clipping said second signal wave when the amplitude thereof reaches a predetermined value, and output circuit means for providing an output wave from said clipped wave including at least one stage of integration.

MARION R. WINKLER.

REFERENCES CITED

The following references are of record in the file of this patent:

UNITED STATES PATENTS

| Number | Name | Date |
|---|---|---|
| 2,113,214 | Luck | Apr. 5, 1938 |
| 2,285,044 | Morris | June 2, 1942 |
| 2,416,329 | Labin et al. | Feb. 25, 1947 |
| 2,434,936 | Labin et al. | Jan. 27, 1948 |
| 2,441,983 | Young | May 25, 1948 |
| 2,448,034 | Labin et al. | Aug. 31, 1948 |